(12) United States Patent
Ishikawa et al.

(10) Patent No.: US 7,377,258 B2
(45) Date of Patent: May 27, 2008

(54) ELECTRONIC CONTROL UNIT AND METHOD FOR CONTROLLING AN IGNITION TIMING OF AN INTERNAL-COMBUSTION ENGINE

(75) Inventors: Yosuke Ishikawa, Saitama (JP); Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 10/528,454

(22) PCT Filed: Oct. 7, 2003

(86) PCT No.: PCT/JP03/12837

§ 371 (c)(1),
(2), (4) Date: Jan. 12, 2006

(87) PCT Pub. No.: WO2004/036036

PCT Pub. Date: Apr. 29, 2004

(65) Prior Publication Data
US 2006/0231071 A1    Oct. 19, 2006

(30) Foreign Application Priority Data
Oct. 21, 2002   (JP) ............................. 2002-305608

(51) Int. Cl.
*F02P 5/145*   (2006.01)

(52) U.S. Cl. ............................. 123/339.11; 123/406.19

(58) Field of Classification Search ................ 123/418, 123/683, 339.11, 339.17, 406.19, 406.44, 123/406.45; 60/274, 276, 285
See application file for complete search history.

(56) References Cited

U.S. PATENT DOCUMENTS

| 5,492,094 | A |   | 2/1996 | Cullen et al. |
| 5,947,083 | A | * | 9/1999 | Ishida ................... 123/339.11 |
| 6,006,723 | A | * | 12/1999 | Akabori et al. ........ 123/339.17 |
| 6,276,131 | B1 | * | 8/2001 | Ueno et al. ................... 60/285 |
| 6,505,594 | B1 | * | 1/2003 | Katayama et al. ..... 123/179.18 |

FOREIGN PATENT DOCUMENTS

| EP | 1 010 880 A2 | 6/2000 |
| EP | 1 079 089 A2 | 2/2001 |

* cited by examiner

*Primary Examiner*—Willis R. Wolfe
*Assistant Examiner*—Johnny H. Hoang
(74) *Attorney, Agent, or Firm*—Arent Fox LLP.

(57) ABSTRACT

An ignition timing value of the internal-combustion engine is calculated by using correction terms including a first correction term that is calculated based on a controlled variable without reflecting a desired value and a second correction term that is calculated based on a difference between the controlled variable and the desired value. The first correction term can be calculated based on the controlled variable with no influence of the desired value. Thus, a sudden change does not occur in the feedback controlled variable even in a situation where the difference between the controlled variable and the desired value changes step-wise. Besides, the first correction term is a proportional term (51) and the second correction term is an integral term (55). The controlled variable is a rotational speed of the internal-combustion engine (NE) that is detected by a detector for detecting the engine rotational speed.

7 Claims, 10 Drawing Sheets

A. ABRUPT RISE

B. SLOW RISE

ELECTRONIC CONTROL UNIT AND METHOD FOR CONTROLLING AN IGNITION TIMING OF AN INTERNAL-COMBUSTION ENGINE

CROSS-REFERENCE TO RELATED APPLICATION

This application is a National Stage entry of International Application No. PCT/JP2003/012837, filed Oct. 7, 2003, the entire specification claims and drawings of which are incorporated herewith by reference.

TECHNICAL FIELD

The present invention relates to an electronic control unit for controlling ignition timing of an internal-combustion engine and it particularly relates to a control unit that is suitable for controlling an ignition timing of an internal-combustion engine immediately after it started.

BACKGROUND ART

The Japanese Patent Application Examined Publication (Kokoku) No. HEISEI 7-59927 discloses a method of calculating an ignition timing of an internal-combustion engine (hereinafter referred to as "engine") immediately after the engine started. According to this method, ignition timing is advanced immediately after the engine started. The ignition timing is shifted to a normal timing when an operational condition parameter reaches a predetermined value.

However, in order to perform so-called FIRE mode for quickly warming up a catalytic converter to bring it active after the engine started, the ignition timing needs to be quickly retarded to raise an exhaust gas temperature. According to the above-disclosed method, the catalyst may not be quickly activated because the retard operation is performed after the ignition timing is advanced and then shifted to the normal ignition timing.

Furthermore, as one approach for controlling an engine, a PI control, a feedback control scheme, is commonly used. According to the PI control, a control input u is obtained according to the following equation (1) where e represents a difference between a desired value and a controlled variable.

$$u = K_p e + K_I \int e \delta \tau \qquad (1)$$

In the equation (1), Kp is a proportional term (P term) and Ki is an integral term (I term). Such control scheme may produce a step in the values of the difference at the start of control or when the desired value is changed. This is because the scheme uses a correction term that reflects the difference between the desired value and the controlled variable. Such a step is not desirable because it may cause a sudden change in the feedback correction amount imposing a significant load to actuators.

Accordingly, it is an objective of the present invention to provide an ignition timing control technique that allows for a quick retard of the ignition timing after the engine starts, raising the exhaust gas temperature and activate the catalyst promptly.

DISCLOSURE OF INVENTION

In order to achieve the above-described objective, the present invention provides an electronic control unit, which is a control unit employing a microcomputer, for controlling an ignition timing of an internal-combustion engine. This electronic control unit is programmed to calculate an ignition timing value of the internal-combustion engine by using correction terms including a first correction term that is calculated based on a controlled variable without reflecting a desired value and a second correction term that is calculated based on a difference between the controlled variable and the desired value.

According to this invention, the first correction term can be calculated based on the controlled variable with no influence of the desired value. Thus, a sudden change does not occur in the feedback controlled variable even in a situation where the difference between the controlled variable and the desired value changes step-wise.

According to one aspect of the invention, the first correction term is a proportion term and the second correction term is an integral term. Besides, according to another aspect of the invention, the controlled variable is a rotational speed of the internal-combustion engine that is detected by a detector for detecting the engine rotational speed and the desired value is a target rotational speed. According to these aspects of the invention, the ascending behavior of the engine rotational speed at the engine starting time is reflected directly on the proportion term. Thus, the ignition timing can be controlled in accordance with such ascending behavior and thus can be shifted to the normal ignition timing smoothly.

According to yet another aspect of the invention, the coefficient (coordination gain) for the first correction term and the coefficient (coordination gain) for the second correction term are given respective values in accordance with engine conditions such as an engine water temperature of the internal-combustion engine. Thus, convergence degree of the controlled variable can be set in accordance with the engine conditions by reflecting the engine conditions onto the correction coefficients.

According to yet another aspect of the invention, the ignition timing value that is obtained through a feed-forward operation based on the engine conditions is compared with another ignition timing value that is obtained by the use of the correction values. A smaller comparison value is used to control the ignition timing of the internal-combustion engine. According to this aspect of the invention, the ignition timing may be changed in accordance with the ascending behavior of the engine rotational speed and thus the timing may be shifted to the normal ignition timing smoothly.

According to yet another aspect of the invention, the value of the ignition timing that is obtained through use of the correction values is used for controlling the ignition timing immediately after the internal-combustion engine starts.

BEST MODE FOR CARRYING OUT THE INVENTION

Figure 1:
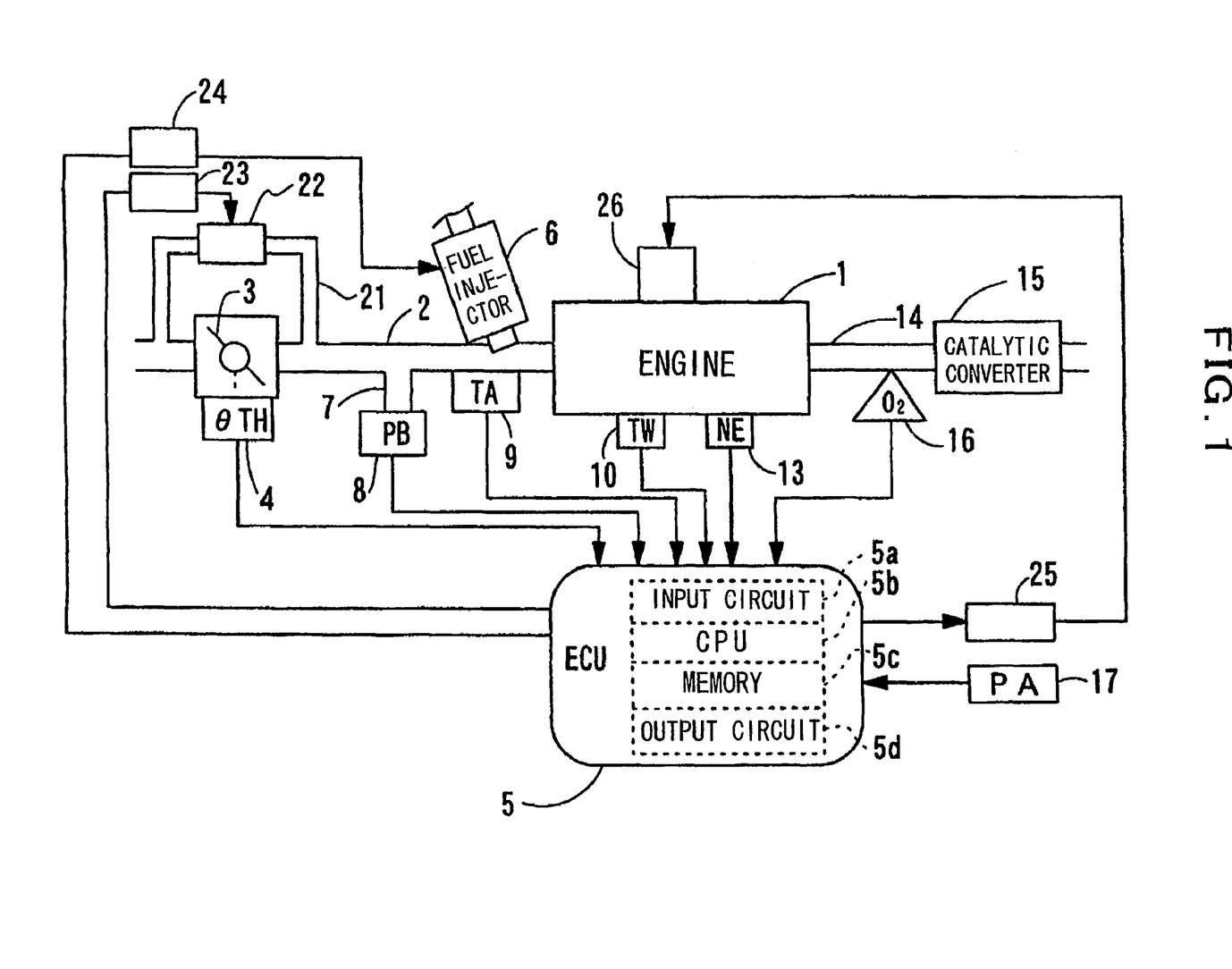
FIG. 1 schematically shows an internal-combustion engine and its control unit in accordance with one embodiment of the present invention.

A preferred embodiment of the present invention will now be described with reference to the accompanying drawings. FIG. 1 shows an overall system structure of an internal-combustion engine (hereinafter referred to as "engine") and its electronic control unit in accordance with one embodiment of the present invention.

An electronic control unit (hereinafter referred to as "ECU") 5 comprises an input circuit 5a for receiving data to be transmitted from various sections of a vehicle, a CPU (central processing unit) 5b for performing calculations required to control each section of the vehicle, memory means 5c having a read only memory (ROM) and a random access memory (RAM) and an output circuit 5d for sending control signals to each section of the vehicle. Programs for controlling each section of the vehicle as well as related various data are stored in the ROM of the memory 5c. A program for implementing a rotational speed control for the internal-combustion engine in accordance with the present invention and the data and tables to be used during execution of the program are stored in the ROM. The ROM may be a rewritable ROM such as an EEPROM. A working space for the calculations by the CPU 5b is provided in the RAM. The data transmitted from each section of the vehicle and the control signals to be sent out to each section of the vehicle are temporarily stored in the RAM.

An engine 1 is, for example, a four-cylinder engine. An intake pipe 2 is connected to the engine 1. A throttle valve 3 is located upstream of the intake pipe 2. A throttle valve opening (θ TH) sensor 4 is connected to the throttle valve 3. The sensor 4 supplies an electric signal corresponding to an opening degree of the throttle valve 3 to the ECU 5.

A passage 21 for bypassing the throttle valve 3 is provided in the intake pipe 2. A bypass valve 22 for controlling the air amount (hereinafter referred to as "intake air amount") to be supplied to the engine 1 is disposed in the bypass passage 21. The bypass valve 22 is driven by a bypass valve actuator 23. The ECU 5 controls the valve opening for the bypass valve 22 by supplying the bypass valve actuator 23 with a bypass opening signal indicating a valve opening of the bypass valve.

A fuel injection valve 6 is provided, for each cylinder, between the engine 1 and the throttle valve 3 and slightly upstream of an air intake valve (not shown) of the air intake pipe 2. Each fuel injection valve 6 is connected to a fuel pump (not shown) and it receives fuel from a fuel tank (not shown) through the fuel pump. The fuel injection valve 6 is driven by a fuel injection valve actuator 24. The ECU 5 controls the valve opening time for the fuel injection valve 6 by supplying fuel injection valve actuator 24 with a signal indicating a valve opening time of the fuel injection valve 6.

An absolute air-intake-pipe internal pressure (Pb) sensor 8 and an intake air temperature (Ta) sensor 9 are disposed downstream of the throttle valve 3 in the air intake pipe 2. The intake pipe pressure Pb and the intake air temperature Ta detected by the Pb sensor 8 and the Ta sensor 9 are converted respectively to electric signals to be transmitted to the ECU 5.

An engine water temperature (Tw) sensor 10 is mounted on a sidewall (not shown) of a cylinder block of the engine 1 where the engine cooling water circulates. The cooling water temperature detected by the Tw sensor 10 is converted to an electric signal to be then transmitted to the ECU 5.

An engine rotational speed (NE) sensor 13 is disposed in the peripheries of the camshaft or the crankshaft (both not shown) of the engine 1. The NE sensor 13 outputs a CRK signal pulse in a cycle of crank angle (for example, 30 degree) that is shorter than a cycle of the TDC signal pulse to be output at a crank angle associated with the position of the TDC of the piston. The CRK signal pulse is counted by the ECU 5, so that the engine rotational speed NE can be detected.

An exhaust pipe 14 is connected to the engine 1 on a downstream side of the engine 1. The engine 1 exhausts gas through a three-way catalytic converter 15 which is an exhaust gas purifying device disposed along the exhaust pipe 14. An O2 sensor 16, which is also disposed along the exhaust pipe 14, serves as an exhaust gas density sensor to detect oxygen density in the exhaust gas and produces an electric signal to be transmitted to the ECU 5.

A spark plug 26 is provided in a combustion chamber (not shown) of the engine 1. The spark plug 26 is electrically connected to the ECU 5 through an igniter 25. The ECU 5 supplies an ignition timing signal to the igniter 25. The spark plug 26 generates sparks to ignite the air-fuel mixture of the combustion chamber.

An atmospheric pressure (Pa) sensor 17 is connected to the ECU 5 in order to detect the atmospheric pressure and convert it to an electric signal for transmission to the ECU 5. Various signals transmitted to the ECU 5 enter into the input circuit 5a. The input circuit 5a adjusts input signal waves, corrects their voltage level to a predetermined level and then converts analog signal into digital signal values. The CPU 5b processes the converted digital signals, executes appropriate operations in accordance with the program stored in the memory means 5c and generates control signals to be provided to the actuators in various sections of the vehicle. The output circuit 5d sends these control signals to the bypass valve actuator 23, the fuel injection valve actuator 24, the igniter 25 and other actuators.

Figure 2:
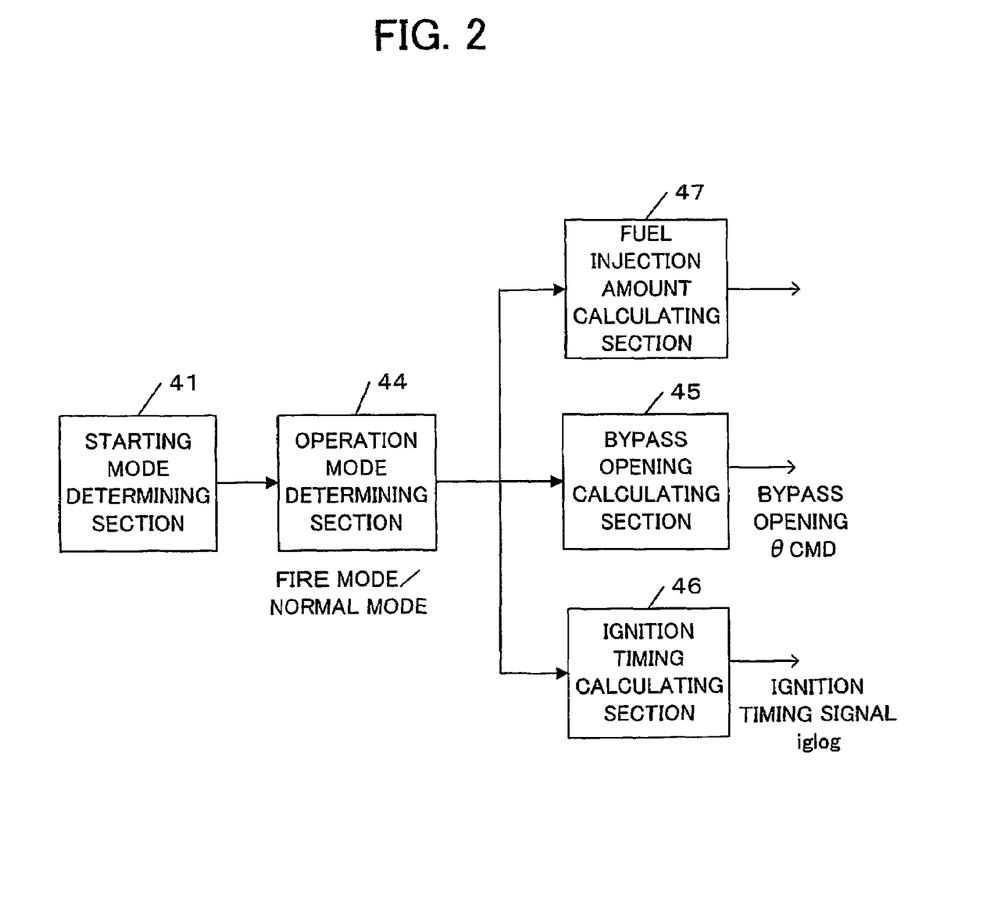
FIG. 2 shows functional blocks of performing an operation at the starting time of the internal-combustion engine in accordance with one embodiment of the present invention.

FIG. 2 shows functional block diagram of an ECU in accordance with one embodiment of the present invention. The functional blocks are typically implemented by software programs.

In response to a cranking operation of the engine 1 driver by a starter motor (not shown), the system shown in FIG. 1 enters into a starting mode. During the starting mode where an accelerator pedal is not depressed, the opening of the throttle valve 4 is zero, and therefore air intake to the combustion chamber is performed only through the bypass valve 22. In the starting mode, ECU 5 carries out a starting mode process. In order to start the engine 1, the starting mode process refers to the table and the equations which are pre-stored in the memory means 5c (FIG. 1) based on the values detected by the various sensors shown in FIG. 1, so as to determine the ignition timing, the fuel supply amount and the bypass opening. According to the determined ignition timing, fuel supply amount and bypass opening, the spark plug 26, the fuel injection valve 6 and the bypass valve 22 are driven. When the complete combustion of the engine 1 is established, the operation is shifted to a FIRE mode in which the catalyst 15 is quickly activated while the engine 1 is maintained in an idling state. A starting mode determining section 41 determines whether or not the starting mode has been completed based on the engine rotational speed NE.

When the starting mode determining unit 41 determines that the starting mode is completed, an operation mode determining unit 44 determines which mode should be performed, FIRE mode or NORMAL mode. A bypass opening calculating unit 45 generates a bypass opening θ CMD for realizing the quick activation of the catalyst 15. The heat quantity of the exhaust gas supplied to the catalyst 15 is almost in proportion to the intake air amount. Therefore, the bypass opening calculating unit 45 calculates the bypass opening θ CMD through the feedback control upon the intake air amount. Such control will be hereinafter referred to as "intake air amount control". Through execution of the intake air amount control, variations in the rising temperature of the catalyst 15 may be resolved. The intake air amount control may use a sliding mode control that is described in, for example, the Japanese Patent Application No. 2002-176782 filed by the same applicant as for the present application.

An ignition timing calculating unit 46 generates an ignition timing signal IGLOG for converging the actual rotational speed NE onto a target rotational speed NOBJ. The ignition timing calculating section 46 calculates the ignition timing IGLOG through the feedback control of the engine rotational speed.

Figure 3:
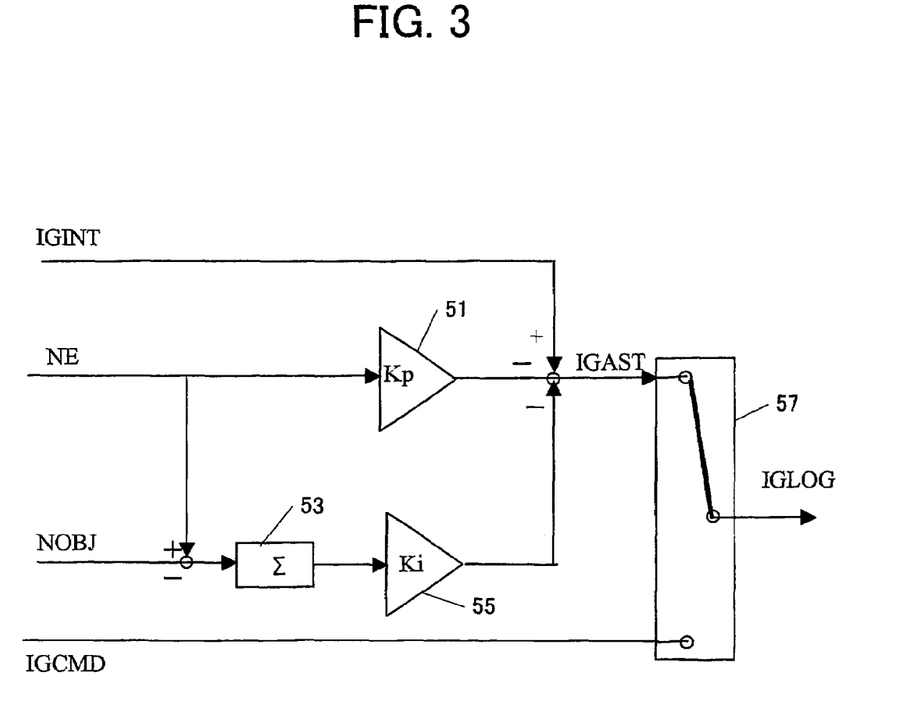
FIG. 3 schematically shows functional blocks of an ignition timing operation circuit in accordance with one embodiment of the present invention.

FIG. 3 shows a structure of an ignition timing calculation circuit in accordance with one embodiment of the present invention. The calculation circuit calculates an ignition timing correction value IGAST according to the following equation (2):

$$IGAST = -Kp \times NE - Ki \times \Sigma(NE - NOBJ) + IGINT \quad (2)$$

In the equation (2), IGINT represents a setup value for the ignition timing just after the engine started the rotation. The IGINT is given a predetermined value in accordance with the engine operational conditions, for example, the engine water temperature. NE represents an engine rotational speed, NOBJ a target engine rotational speed, Kp a proportion term gain, and Ki an integral term gain respectively.

The first term in the equation (2), which is a proportional term in the IP control (proportional term preceding control), has a role of retarding the ignition timing only in proportion to the controlled variable, that is, NE. The proportion term as shown in the equation (1) is a proportional term in a conventional PI control, and is proportional to the difference between the controlled variable NE and the desired value. For that reason, if the conventional PI control is used for the ignition timing control immediately after the engine starts, the difference between the controlled variable NE and the desired value NOBJ immediately becomes a negative value. As a result, the ignition timing is advanced in a spike shape and the correction amount takes a positive value until the NE reaches the desired value. On the other hand, the proportional term in the IP control in accordance with the present invention is not dependent on the desired value, resulting in a negative correction values reflecting the rising degree of the NE. In other words, the retard amount is increased in case of abrupt rise of the NE whereas the retard amount is decreased in case of slow rise of the NE.

The second term in the equation (2), which is the integral term in the IP control, has a role of gradually advancing the ignition timing in accordance with the difference between the controlled variable NE and the desired value NOBJ. There occurs no step in the correction amount at the control starting time because the correction amount is calculated in accordance with the accumulated value of the difference between the controlled variable NE and the desired value NOBJ (the calculated value is an accumulated value because the calculation is performed upon the discrete values. It is equivalent to an integral value in an analogue calculation).

Figure 4:
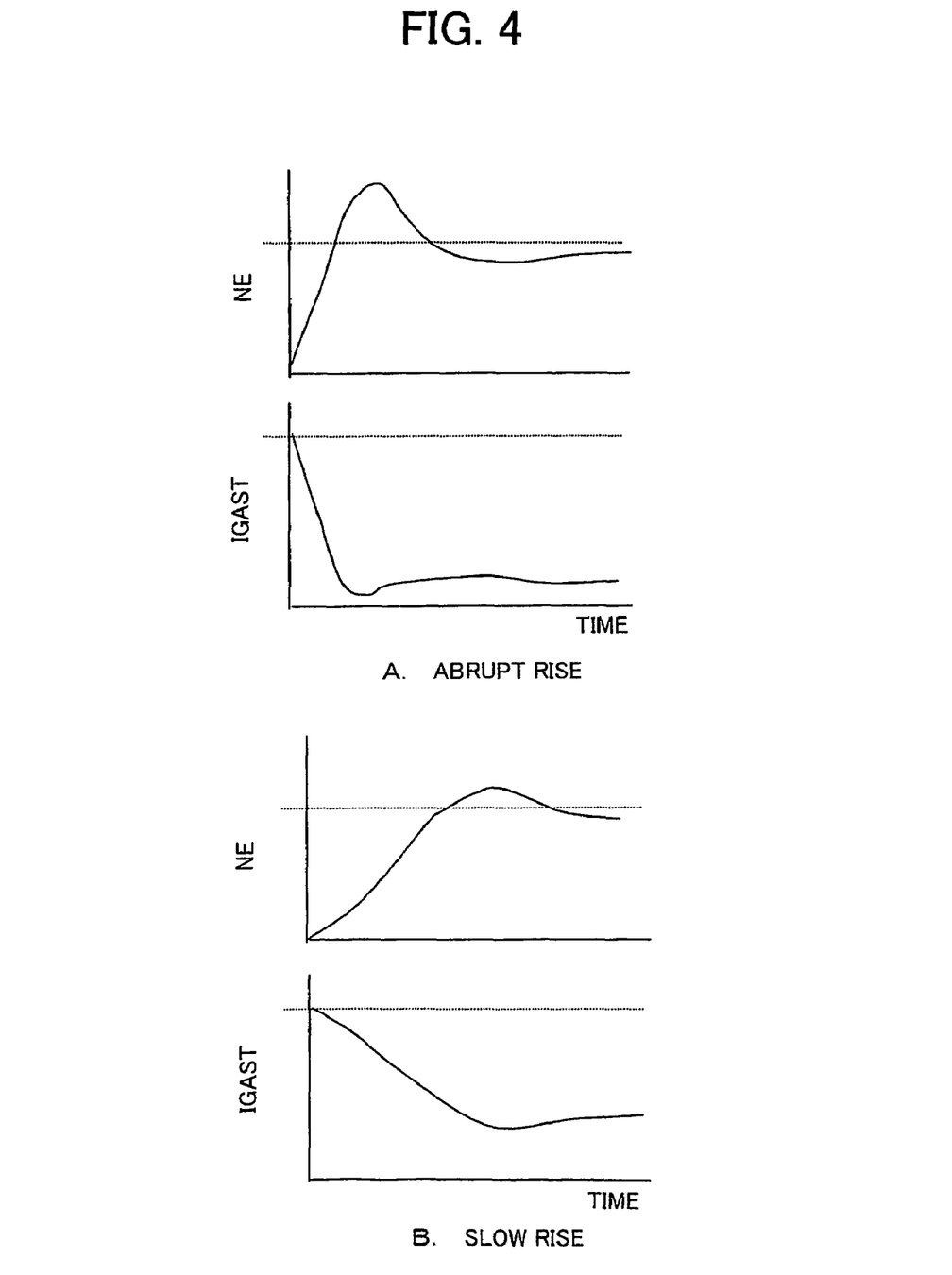
FIG. 4 shows a difference of the ignition timing between an abrupt rise (A) of the engine rotational speed and a slow rise (B) in accordance with one embodiment of the present invention.

FIG. 4 shows a relation between the ascending state of the engine rotational speed NE just after the engine starts and the ignition timing correction amount IGAST calculated in accordance with the equation (2).

Under such conditions that the ignition timing needs to be quickly retarded and the intake air amount needs to be increased for heating up the catalyst quickly (FIRE mode) after the engine started, the proportional term gain is made dominant. In contrast, under such conditions that quick warm-up of the catalyst is not required but the ignition timing needs to be advanced to a suitable ignition timing point for generating an optimal torque, the integral term gain is made dominant. Thus, it is possible to quickly change the ignition timing to a desirable ignition timing setup.

In the circuit shown in FIG. 3, the correction amount IGAST calculated through the IP control is compared at a selector 57 with the value IGCMD for the ignition timing under ordinary conditions. Smaller value is selected out of the two values. IGCMD is typically determined based on the engine water temperature TW, the engine rotational speed NE, and the intake pipe pressure PB. IGCMD is not described in detail because it is conventional. The value of the ignition timing that has been thus selected becomes a final ignition timing value IGLOG.

Figure 5:
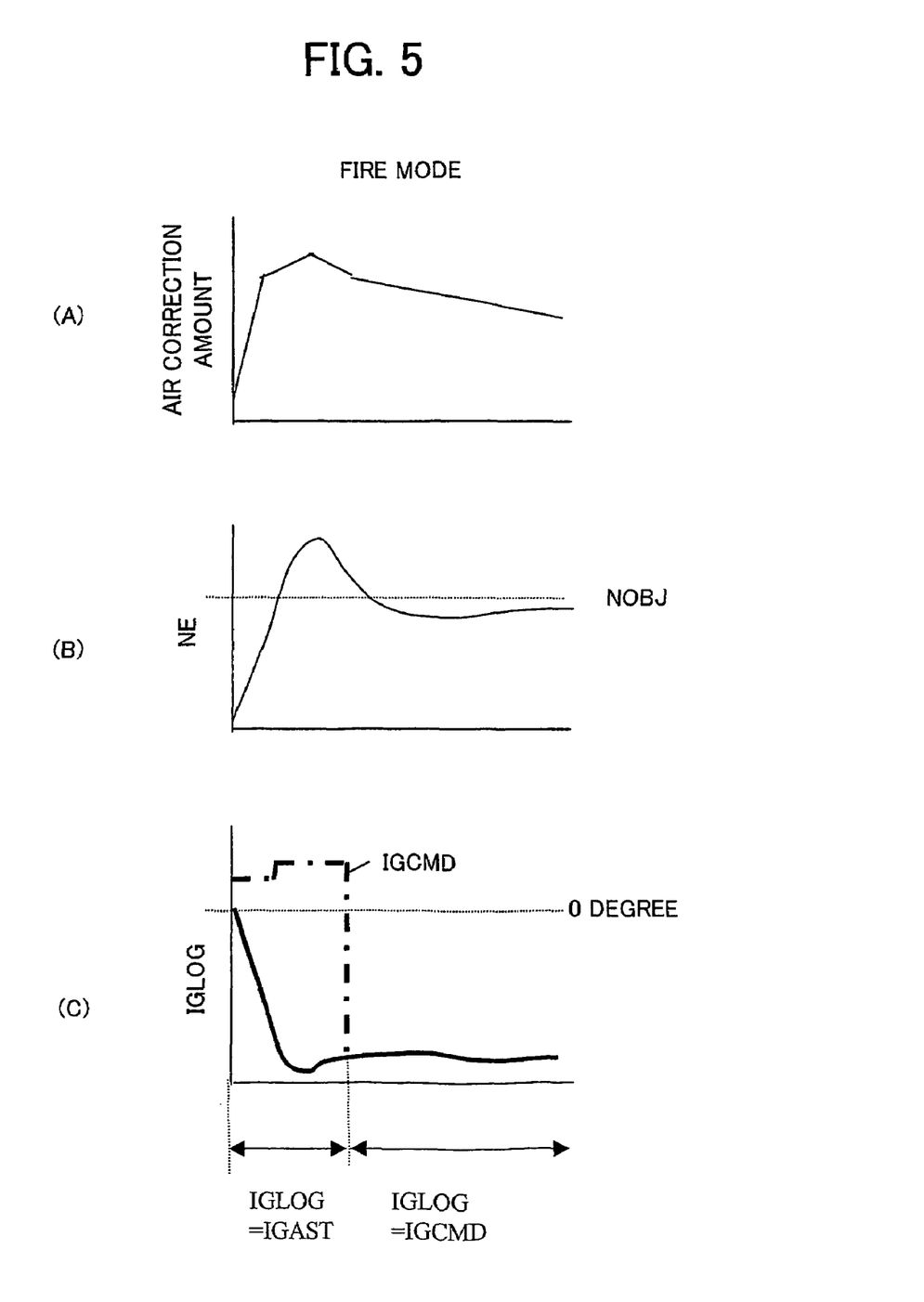
FIG. 5 shows a relation among the intake air correction amount (A), the engine rotational speed (B) and the ignition timing IGLOG (C) in the FIRE mode in accordance with one embodiment of the present invention.

Now referring to FIG. 5, in the quick catalyst warming-up mode in which the ignition timing must be retarded for quick warming up the catalyst, the operation determining unit 44 (FIG. 2) selects the FIRE mode, responsive to which the bypass opening calculating unit 45 calculates a bypass opening for the FIRE mode, and the ignition timing calculating unit 46 starts providing ignition timing signal IGCMD for use with the FIRE mode, the signal IGCMD being for retarding the ignition timing. Before such IGCMD is generated, IGAST is selected. FIG. 5(A) shows the intake air amount that is introduced in accordance with the bypass opening for the FIRE mode which is calculated by the bypass opening calculating unit 45. FIG. 5(B) indicates that the engine rotational speed NE increases just after the engine started and converges into a target rotational speed NOBJ.

FIG. 5(C) shows the relation between the ignition timing value IGCMD that is calculated by the ignition timing calculating unit 46 and the ignition timing value IGAST that is calculated by the circuit of FIG. 3 according to the equation (2) based on the IP control of the present invention. The selector 57 of FIG. 3 selects the smaller of these values and outputs it as IGLOG. The ignition timing of the engine is controlled in accordance with IGLOG. In the FIRE mode, in order to raise the exhaust gas temperature, the proportional term gain Kp is made dominant and the intake air amount is increased, so that the value of the IGLOG quickly becomes a negative (retard) value almost in proportion to the increase of the engine rotational speed NE. When the engine rotational speed NE begins to converge toward the target rotational speed NOBJ, the ignition timing calculating unit 46 (FIG. 2) starts to output the ignition timing value IGCMD that indicates a retard value for the FIRE mode. When this state begins, IGAST has already started to increase toward the advance direction because of the effect of the integral term, and IGAST eventually becomes larger than IGCMD. At this time, the selector 57 of FIG. 3 chooses IGCMD.

Figure 6:
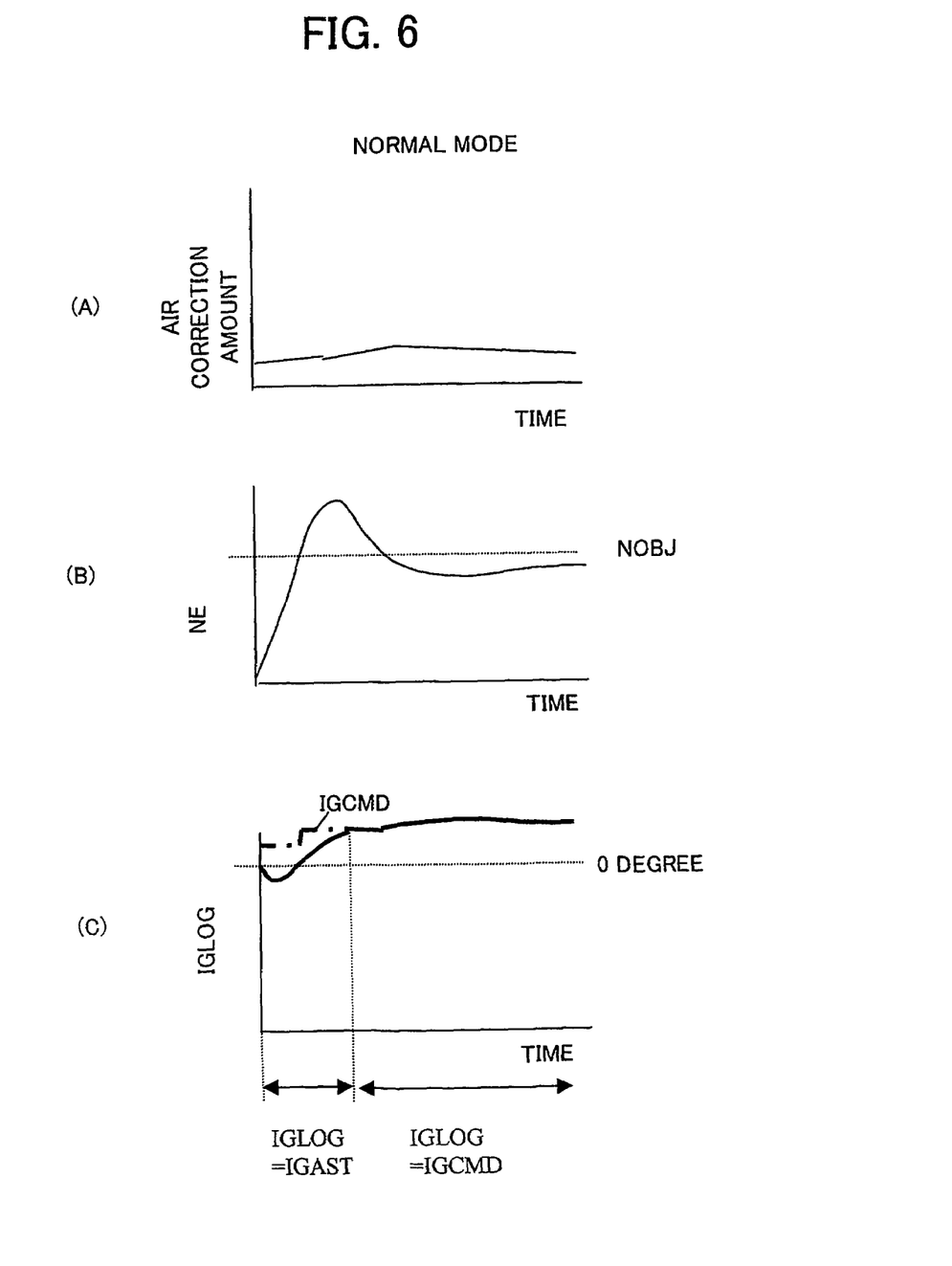
FIG. 6 shows a relation among the intake air correction amount (A), the engine rotational speed (B) and the ignition timing IGLOG (C) in the NORMAL mode in accordance with one embodiment of the present invention.

Referring to FIG. 6, in the normal mode in which the FIRE process is not performed the intake air amount is maintained to be small because it is not required to raise the exhaust gas temperature. In this mode, the proportional term gain Kp of the equation (2) is set smaller and the integral term gain Ki is set larger. Accordingly, the IGAST takes a negative value when the engine rotational speed NE is increased, but its absolute value is significantly smaller than in case of the FIRE mode of FIG. 5. The second integral term of the equation (2) has a function of setting the IGAST forward to the advance direction. So, the IGAST eventually starts to take an advance value owing to the function of the integral term gain that is now dominant in the equation. On the other hand, the ignition timing calculating unit 46 sets the IGCMD to an advance value in order for the engine to generate an optimal torque. When the value IGAST exceeds the value IGCMD, the selector of FIG. 3 switches the output IGLOG to IGCMD so as to shift the control mode to the normal ignition timing control.

Figure 7:
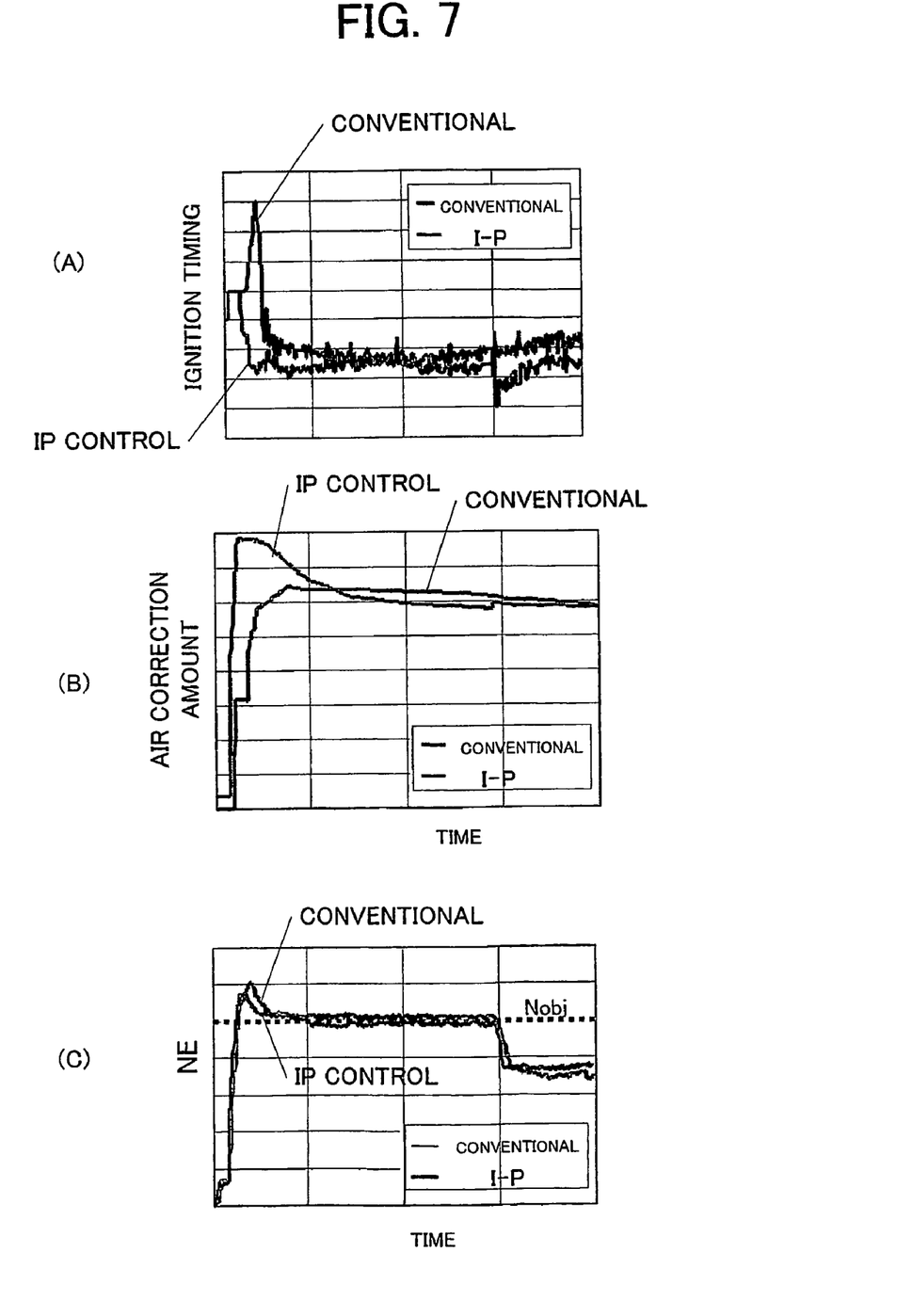
FIG. 7 shows a relation among the ignition timing (A), the intake air correction amount (B) and the engine rotational speed (C) in accordance with an IP control that is one embodiment of the present invention.

FIG. 7 shows a comparison of the conventional method with one embodiment of the present invention. According to the conventional method, the ignition timing is advanced by a given increment immediately after the engine starts until the ignition timing reaches IGCMD for setting the normal ignition timing. Then, the ignition timing is started to restart as the IGCMD starts feedback for the FIRE mode. In contrast, according to the embodiment of the present invention, the retard operation is promptly started immediately after the engine start by virtue of the function of the integral term of the IP control. In the FIRE mode, it is required to increase the intake air amount even just after the engine starts in order to deliver a large amount of heat to the catalyst. In the conventional method, the intake air amount had to be limited in order to control the increase of the engine rotational speed NE. According to the embodiment of the present invention, retarding of the ignition timing starts immediately after the engine starts, so that increase of the torque can be controlled and increase of the rotational speed NE can be prevented. Therefore, a large amount of air can be introduced to provide a large amount of heat to the catalyst even immediately after the engine starts.

As described above, according to one embodiment of the present invention, exhaust gas temperature of the engine and catalyst temperature in the FIRE mode can rise very quickly in comparison with the conventional method by retarding the ignition timing and increasing the intake air amount immediately after the engine starts. Thus, the present invention contributes to a decrease of the emission by virtue of a quick activation of the catalyst when the engine starts.

Figure 8:
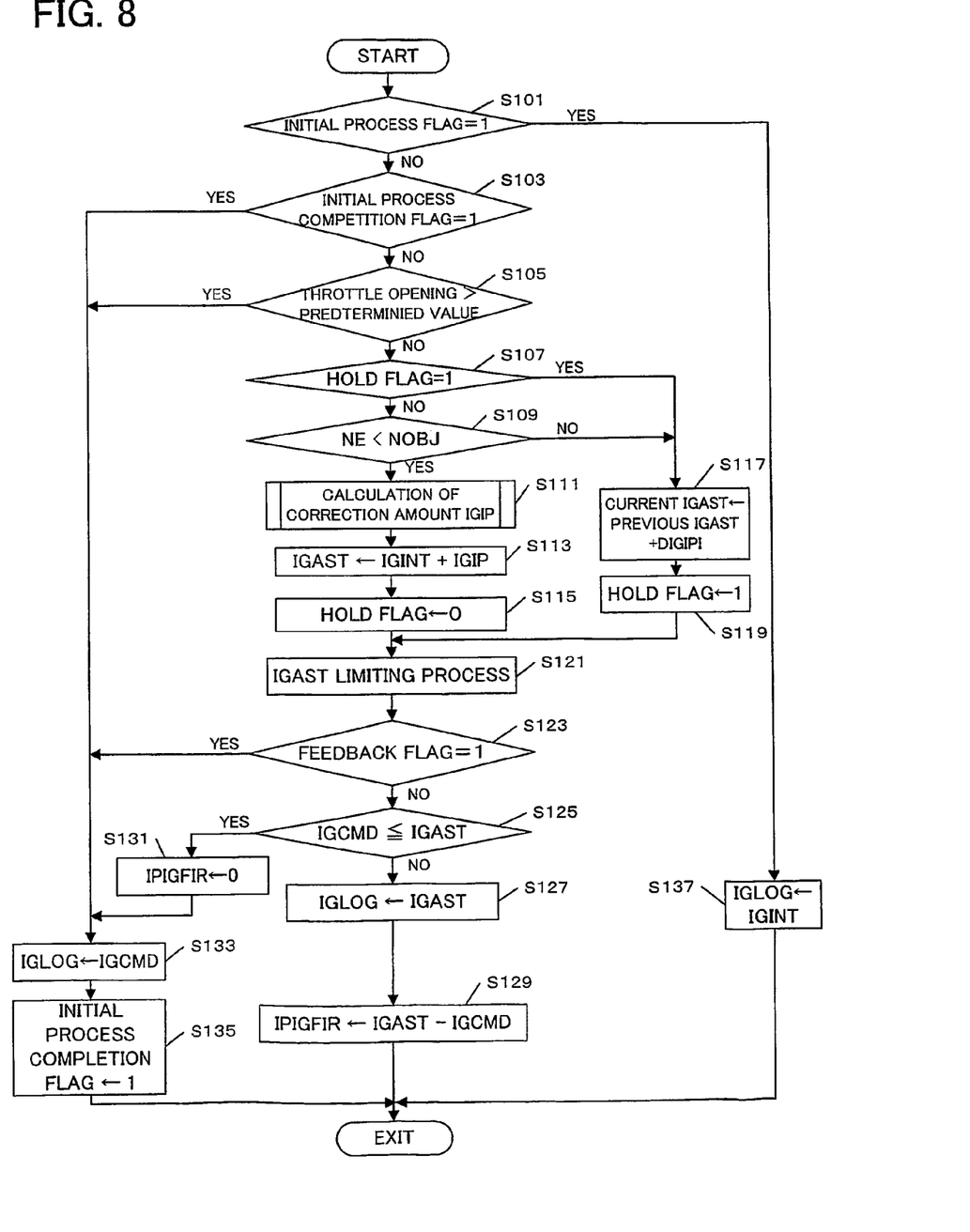
FIG. 8 show a flowchart of a process in accordance with one embodiment of the present invention.

Now referring to FIG. 8, a process of the ignition timing control in accordance with one embodiment of the present invention will be described. This process is performed in a predetermined cycle, for example, in a crank angle cycle (TDC). When the engine starts, an initial process flag is set to 1 and an initial ignition timing value IGINT for the start time is set to an ignition timing setup value IGLOG (S137).

Thus, when a cranking operation for starting the engine is carried out and the engine starts, the initial process flag is set to 0 and the process proceeds to step S103, in which it is determined whether or not an initial process completion flag has been set to 1. The initial process completion flag indicates completion of the initial process after the engine starts. At first, the initial process completion flag has not been set to 1. So, the process proceeds to step S105, in which the throttle opening is examined. When the throttle opening is more than a predetermined value, the ignition timing operation in accordance with the resent invention is terminated and the normal ignition timing IGCMD is reflected on the final ignition timing IGLOG.

When the throttle opening is no more than the predetermined value, the engine is in an idling state after the engine starts. Accordingly, it is determined in step S107 whether or not an integral term hold flag has been set to 1. As seen in the equation (2), the integral term works to advance the ignition timing when the engine rotational speed NE is below the target rotational speed NOBJ, but it works to retard the ignition timing when the engine rotational speed NE exceeds the target rotational speed NOBJ. According to this embodiment, when the engine rotational speed NE exceeds the desired value NOBJ (S109), the control process stops increase of the retard produced by the proportional term and holds the increment DIGIPI (this will be described later with reference to FIG. 9) produced by the integral term (S119). As seen in FIG. 5, when the engine rotational speed is increased, the ignition timing is retarded almost in proportion to the rotational speed due to the function of the proportional term. Furthermore, when the rotational speed exceeds the target rotational speed, the increment DIGIPI by the integral term also turns to a negative value and the integral term changes toward a decreasing direction. At this time point, the increment DIGIPI by the integral term is held in order to prevent the ignition timing from being excessively retarded.

When the engine rotational speed NE is below the target rotational speed NOBJ in step S109, the process moves to a subroutine S111 in which an ignition timing correction amount is calculated in accordance with the IP control of the present invention. This subroutine will be described later with reference to FIG. 9. The correction amount IGIP is added to the initial ignition timing value IGINT to obtain the ignition timing value IGAST (S113). The hold flag is reset to 0 (S115). In step S121, a limiting process is performed upon the ignition timing value IGAST. In other words, the value IGAST is limited so as not to exceed a given value.

Next, in step S123, it is determined whether or not a feedback flag is set to 1. This flag is set to 1 when the process immediately after starting the engine start has been completed and the feedback calculation of the normal ignition timing IGCMD is being calculated. In such condition, the feedback control of IGCMD is prioritized, so that the value of IGCMD is used as a value of IGLOG (S133). When this situation is entered, the initial process completion flag is set to 1 (S135). This flag is examined in step S103.

When the feedback flag is not set, the ignition timing value IGAST that has been calculated according to the IP control is compared with the ignition timing IGCMD that has been set by the program (S125). When the IGAST is smaller than the IGCMD, the value of IGAST is selected as the ignition timing IGLOG (S127). In step S129, the difference IPIGFIR between the IGAST and the IGCMD is stored in the memory. This difference is used as an initial value when the feedback control of the IGCMD is started.

When the IGCMD does not exceed the IGAST, the difference value IPIGFIR is reset to 0 (S131) and the value of IGCMD is selected as the ignition timing IGLOG (S133). At this time, the initial process completion flag is set to 1 as above described (S135).

Figure 9:
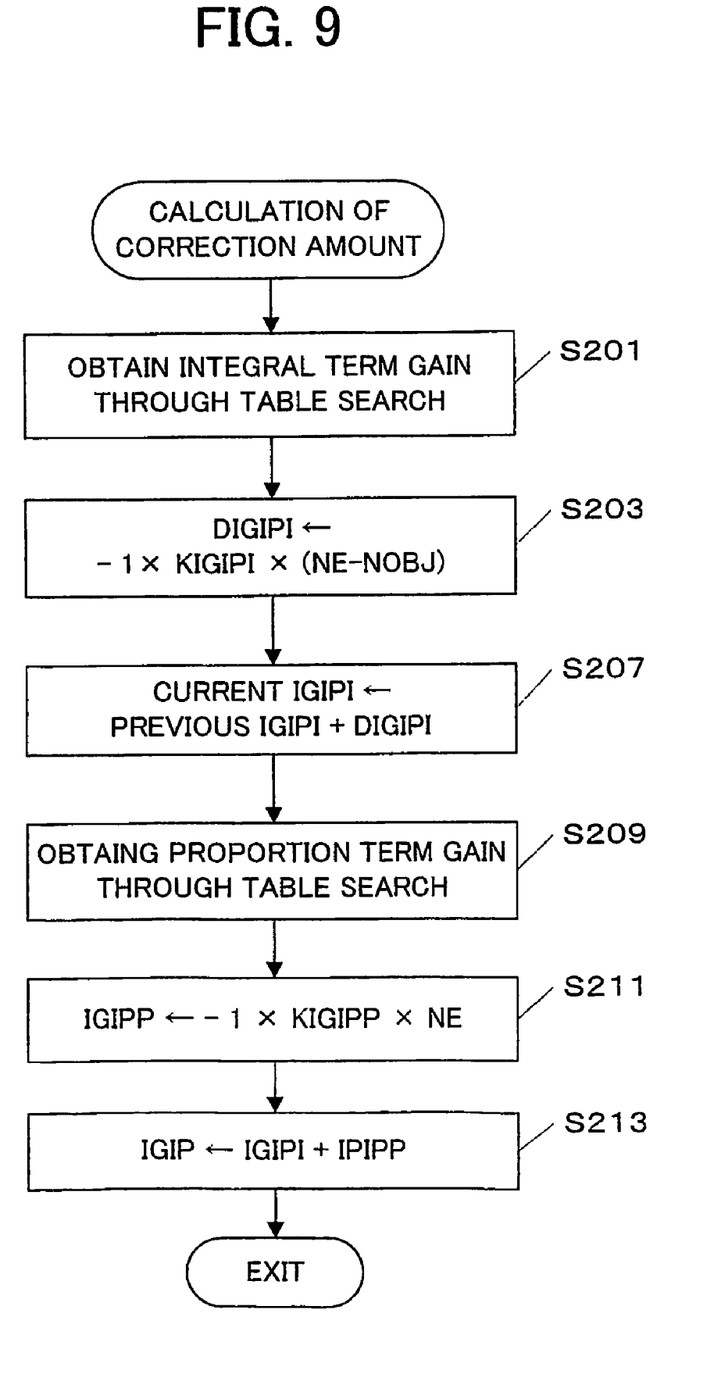
FIG. 9 shows a flowchart of a process for calculating an ignition timing correction amount in accordance with one embodiment of the present invention.
Figure 10:
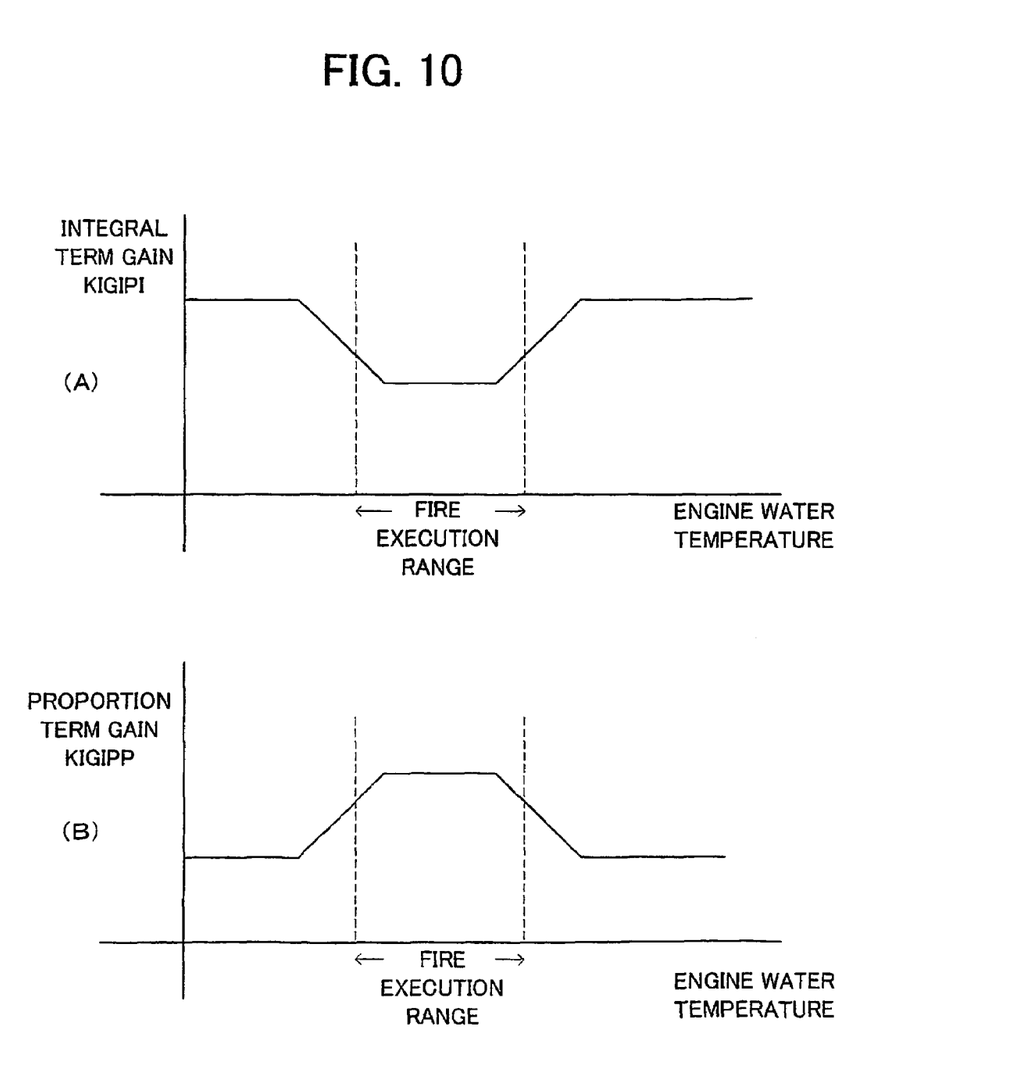
FIG. 10 graphically shows a table through which an integral term gain and a proportion term gain are obtained based on the engine water temperature.

Now referring to FIG. 9, a calculation process of the ignition timing correction amount IGIP according to the IP control of the subroutine Sill will be described. At first, the table (refer to FIG. 10), which is prepared and stored in the ROM, is searched in accordance with the engine water temperature so as to obtain the value of the integral term gain KIGIPI (S201). Next in step S203, the difference between the engine rotational speed NE (which is the controlled variable) and the desired value NOBJ is multiplied by the integral term gain KIGIPI, so that the increment DIGIPI of the integral term is obtained. Then, the increment DIGIPI is added to the previous value of the integral term to obtain the current value of the integral term (S207).

Next, the table (FIG. 10), which is prepared and stored in the ROM, is searched in accordance with the engine water temperature so as to obtain the value of the proportion term gain KIGIPP (S209). The engine rotational speed NE is multiplied by the proportion term gain KIGIPP to obtain the proportional term value IGIPP (S211). The integral term IGIPI and proportional term IGIPP thus obtained are added to obtain the correction amount IGIP (S213).

Although the present invention has been described with reference to the specific embodiment, the invention is not intended to be limited to such embodiment.

Besides, the present invention can be applied to such vessel-propelling engine as an outboard motor having a vertically extending crankshaft.

The invention claimed is:

1. An electronic control unit for controlling an ignition timing of an internal-combustion engine, the electronic control unit being programmed to:
   calculate an ignition timing value of the engine by using a first correction term proportional to a controlled variable and a second correction term proportional to an integration of differences between said controlled variable and a desired value,
   wherein the ignition timing value IGAST is calculated by the following expression:

$$IGAST = -Kp \times NE - Ki \times \Sigma(NE - NOBJ) + IGINT$$

where Kp is a correction coefficient for a proportional term, NE is a rotational speed of the engine, Ki is a correction coefficient for a integral term, NOBJ is a desired rotational speed of the engine, and IGNT is a constant.

2. The electronic control unit as claimed in claim 1, further comprising a detector for detecting a rotational speed of the engine, said rotational speed being the controlled variable and the desired value being a target rotational speed.

3. The electronic control unit as claimed in claim 1, wherein the electronic control unit is configured to compare an ignition timing value obtained by a feed-forward operation based on conditions of the engine and the ignition timing value obtained by said expression, and to use the smaller timing value for controlling the ignition timing of the engine.

4. The electronic control unit as claimed in claim 3, wherein the value of the ignition timing value that is obtained by said expression is used for controlling the ignition timing immediately after the engine starts.

5. An electronic control system for controlling an ignition timing of an internal-combustion engine, comprising:
   means for calculating an ignition timing value of the engine by using a first correction term proportional to a controlled variable and a second correction term proportional to an integration of differences between said controlled variable and a desired value.
   wherein the ignition timing value IGAST is calculated by the following expression:

$$IGAST = -Kp \times NE - Ki \times \Sigma(NE - NOBJ) + IGINT$$

where Kp is a correction coefficient for a proportional term, NE is a rotational speed of the engine, Ki is a correction coefficient for a integral term, NOBJ is a desired rotational speed of the engine, and IGNT is a constant.

6. A method for controlling an ignition timing of an internal-combustion engine, comprising:
   calculating an ignition timing value of the engine by using a first correction term proportional to a controlled variable and a second correction term proportional to an integration of differences between said controlled variable and a desired value,
   wherein the ignition timing value IGAST is calculated by the following expression:

$$IGAST = -Kp \times NE - Ki \times \Sigma(NE - NOBJ) + IGINT$$

where Kp is a correction coefficient for a proportional term, NE is a rotational speed of the engine, Ki is a correction coefficient for a integral term, NOBJ is a desired rotational speed of the engine, and IGNT is a constant.

7. A computer readable medium comprising a computer program which is configured to cause a processor to execute a function of controlling an ignition timing of an internal-combustion engine, said program comprising:
   a computer program code for calculating an ignition timing value of the engine by using a first correction term proportional to a controlled variable and a second correction term proportional to an integration of differences between said controlled variable and a desired value.
   wherein the ignition timing value IGAST is calculated by the following expression:

$$IGAST = -Kp \times NE - Ki \times \Sigma(NE - NOBJ) + IGINT$$

where Kp is a correction coefficient for a proportional term, NE is a rotational speed of the engine, Ki is a correction coefficient for a integral term, NOBJ is a desired rotational speed of the engine, and IGNT is a constant.

* * * * *